US007602453B2

(12) United States Patent  
Kawano et al.

(10) Patent No.: US 7,602,453 B2  
(45) Date of Patent: Oct. 13, 2009

(54) DISPLAY DEVICE

(75) Inventors: Hideo Kawano, Kawasaki (JP); Hideki Sunayama, Hachiouzi (JP)

(73) Assignee: Info Vision Optoelectronics Holdings Limited, Tortola (VG)

( * ) Notice: Subject to any disclaimer, the term of this patent is extended or adjusted under 35 U.S.C. 154(b) by 99 days.

(21) Appl. No.: 11/900,246

(22) Filed: Sep. 11, 2007

(65) Prior Publication Data  
US 2008/0074571 A1 Mar. 27, 2008

(30) Foreign Application Priority Data  
Sep. 11, 2006 (JP) ............... 2006-246079

(51) Int. Cl.  
*G02F 1/1343* (2006.01)

(52) U.S. Cl. ........................................ 349/39
(58) Field of Classification Search .................. 349/39  
See application file for complete search history.

(56) References Cited  
U.S. PATENT DOCUMENTS  
6,724,358 B2 * 4/2004 Ban et al. .................. 345/92

6,822,708 B2 * 11/2004 Fujino .................. 349/113

FOREIGN PATENT DOCUMENTS  
JP 08-234227 9/1996

\* cited by examiner

*Primary Examiner*—Charlie Peng  
(74) *Attorney, Agent, or Firm*—Scully, Scott, Murphy & Presser, P.C.

(57) ABSTRACT

A liquid crystal display (LCD) device has a wiring structure of superfine wiring, wherein it can reduce the occurrence rate of electrostatic discharge (ESD), and the time constant of the scan line can be improved simultaneously. The wiring width in the portions of the scan lines where they intersect the auxiliary capacitance bunching lines is narrowed, so that the area of the intersection and the wiring capacitance is reduced, thus the time constant of the scan line is decreased, meanwhile, the wiring width in portions of the auxiliary capacitance lines where they intersect the auxiliary capacitance bunching line is enlarged, the distance between the adjacent scan line and the nearest portion of the auxiliary capacitance line is shortened, and the ESD occurs at the nearest portion, and the failure products caused by the ESD can be decreased.

8 Claims, 3 Drawing Sheets

DISPLAY DEVICE

The present invention claims the benefit of Japanese Patent Application No. 2006-246079, filed in Japan on Sep. 11, 2006, which is hereby incorporated by reference.

FIELD OF THE INVENTION

The present invention relates to a superfine wiring structure of an active matrix type liquid crystal display device.

DESCRIPTION OF THE RELATED ART

Recently, the mainstream of the liquid crystal display device is active matrix type liquid crystal display device having Thin Film Transistor (TFT). Following the display picture being large-scaled and having high definition, the number of pixels in each of the display devices is increased in such active matrix type liquid crystal display device, meanwhile, the pitch for arranging the pixel electrodes is refined year by year.

Under such condition, in order to reduce the cost for manufacturing TFT array substrate, the finished-product-rate should be maintained and improved, even though the pitch for arranging the pixel electrodes on the TFT array substrate becomes fine. The failure manufacture caused by the static electricity damage in the manufacturing process is a condition that counteracts the increase of the finished-product-rate. In such manufacturing process, the following means is used as a method for reducing the damage from the static electricity: short-circuited ring is provided on the regions of the TFT array substrate except the display portion for short-circuiting all of the signal lines, auxiliary capacitance lines, and the like on the TFT array substrate, and the short-circuited ring is removed at the end of the manufacturing process. Furthermore, the short-circuited ring can also be not removed, while its resistance can be increased so that it will not be affected by the existence of the short-circuited ring under normal operation condition.

FIG. 3 is a schematic plan view of TFT array substrate having a short-circuited ring. The short-circuited ring 31 is positioned at the peripheral edges of TFT array substrate 30 for short-circuiting the auxiliary capacitance line 2, scan line 1, signal line 32 in order to prevent from damaging by the static electricity.

However, even though with the aid of the above short-circuited ring, the static damage in the previous manufacturing process before forming the short-circuited ring and the static damage after removing the short-circuited ring still cannot be prevented from occurring. As shown in Patent Document 1 (Japanese Publication No. 1996-234227), the following means is used as a means for solving this subject: at the positions on the peripheral edges of TFT array substrate where the function failure of TFT array substrate will not occur even though the static damage occurs, projective pads are disposed on the auxiliary capacitance lines and scan lines, respectively, and the projections on the pads of both parts are opposite with each other, the discharge will be occurred easily between these projections, thereby the static damage that causes the function failure at these positions can be prevented.

The situation in which that the function failure of TFT array substrate will not occur even though the static damage occurs and the situation in which the function failure occurs will be described with reference to the drawings. FIG. 4 is a cross sectional diagram showing the defects of the pinholes occurs on the insulating layer which is damaged by the static discharge in the manufacturing process for the display device. In FIG. 4, 41 is a glass substrate, 45 is an insulating layer, 46 is a semiconductor layer, 47 is a pinhole formed by accumulating the static electricity on the scan line and then discharging due to a certain reason.

Under a condition that such a pinhole 47 is formed, in the subsequent manufacturing process, if only an insulating layer will be formed at the position where a pinhole is formed, the function failure will not occur. On the other hand, if a line relating to a function, for example, a scan line, as shown in FIG. 5, will be formed above the pinhole 47, then a short-circuit will occur between the signal line 44 and the scan line 1, thus the function failure will occur.

It is disclosed in Literature 1 that the projective portions for discharging easily are disposed at the positions where the function failure will not occur even though the static damage occurs; thereby the static damage relating tightly to the function failure can be prevented from occurring.

However, if such projections are not disposed, then the suitable arrangement is: the normal wiring state is maintained if possible, on the other hand, the static discharge is generated at the positions where the function failure will not occur even though the static discharge occurs.

Furthermore, under the condition that the number of the scan lines tends to be increased while the picture tends to be large-scaled recently, it is necessary to speed up the electrical signals applied to the scan lines in order to maintain and improve the display quality of the picture. In order to deal with such requirement, it is necessary to decrease the time constant of the scan line.

SUMMARY OF THE INVENTION

Therefore, the object of the present invention is to provide a wiring structure for superfine wiring which can be used in an active matrix type liquid crystal display device, which can reduce the occurrence rate of the failures caused by the static damage on the insulating layer of the electrodes or between the electrodes in the manufacturing process, and the time constant of the scan line can be improved simultaneously.

In order to solve the above problem, the display device of the first aspect of the present invention comprises:

a pixel electrode array substrate, comprising: a plurality of scan lines, a plurality of auxiliary capacitance lines, signal lines formed crossing said scan lines and said auxiliary capacitance lines, pixel electrode disposed in each of the areas formed by said plurality of scan lines and said plurality of signal lines which intersect with each other;

a contraposition substrate opposite to said pixel electrode array substrate;

auxiliary capacitance bunching lines making said plurality of auxiliary capacitance lines be short-circuited in the peripheral area around said pixel electrodes and disposed in parallel with respect to said signal lines; and an optical modulation layer disposed between said pixel electrode array substrate and said contraposition substrate, wherein a scan line rectangular portion whose width of scan lines is narrowed is disposed in the portions where said scan lines intersects said auxiliary capacitance bunching lines, and a scan line rectangular corner portion is disposed on the edge of the portion whose width of scan lines is normal, an auxiliary capacitance rectangular portion whose width of auxiliary capacitance lines is widened is disposed in the portions where said auxiliary capacitance lines intersects said auxiliary capacitance bundling lines, and an auxiliary capacitance rectangular corner portion opposite to said scan line rectangular corner portion is disposed in said auxiliary capacitance rectangular portion.

As well as, the invention of the second aspect of the present invention, wherein said auxiliary capacitance line rectangular portion is formed to have a line width which goes beyond the line width of said auxiliary capacitance bunching lines at both sides of said intersected auxiliary capacitance bunching lines, meanwhile, said scan line rectangular portion is also formed to have a line width which goes beyond the line width of said auxiliary capacitance bunching lines at both sides of said intersected auxiliary capacitance bunching lines, and the length of said auxiliary capacitance line rectangular portion at the direction of said auxiliary capacitance line and the length of said scan line rectangular portion at the direction of said scan line are substantially the same.

As well as, the invention of the third aspect of the present invention wherein, the angles of said scan line rectangular corner portion and said auxiliary capacitance line rectangular corner portion are formed to be approximately 91 degrees.

As well as, the invention of the fourth aspect of the present invention, wherein said optical modulation layer comprises liquid crystal layer.

As well as, the invention of the fifth aspect of the present invention, wherein said optical modulation layer comprises liquid crystal layer.

According to the present invention, at the positions where the function failure cannot be occurred easily even though the static damage occurs, the portions that the static damage will be occurred easily can be manufactured without providing special projections, thereby the occurrence rate of the unqualified products in the manufacturing process can be reduced. Furthermore, the width of the scan line at the intersection portions of the scan lines and the auxiliary capacitance bunching lines is narrowed, thus, the capacitance formed in the intersection portions of the scan lines and the auxiliary capacitance bunching lines can be reduced, resulting in that the time constant of the scan line is decreased, and the electrical signals having higher speed can be provided to the scan lines. Thereby, displaying the large-scaled picture and the improvement of the display quality can be obtained.

Figure 1:
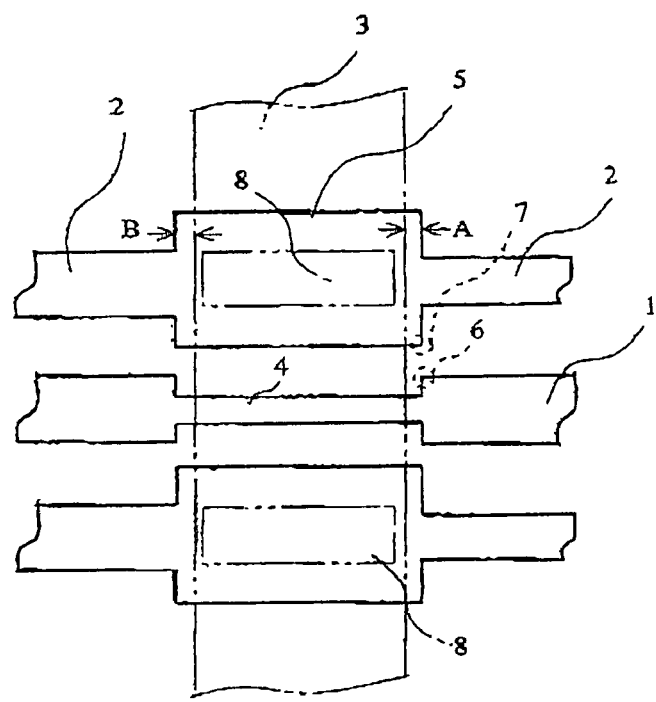
FIG. 1 is a schematic plan view for illustrating a part of the TFT array substrate of the display device according to an embodiment of the present invention.

1 scan line
2 auxiliary capacitance line
3 auxiliary capacitance bunching line
4 scan line rectangular portion
5 auxiliary capacitance line rectangular portion
6 scan line rectangular corner portion
7 auxiliary capacitance line rectangular corner portion
8 through hole
41 glass substrate
44 signal line
45 insulating layer
46 semiconductor layer
47 pinhole

DETAILED DESCRIPTION OF THE INVENTION

The preferred embodiments of the present invention will now be described by referring to the drawings as follows.

Figure 2:
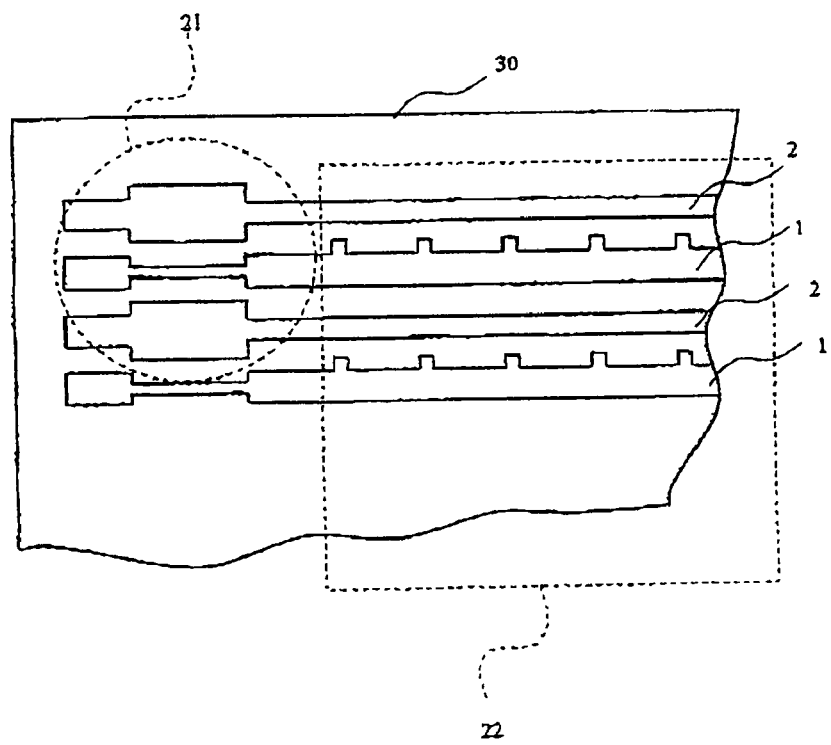
FIG. 2 is a partial schematic plan view of the TFT array substrate for indicating the position of the portion relating to FIG. 1 on the TFT array substrate.
Figure 3:
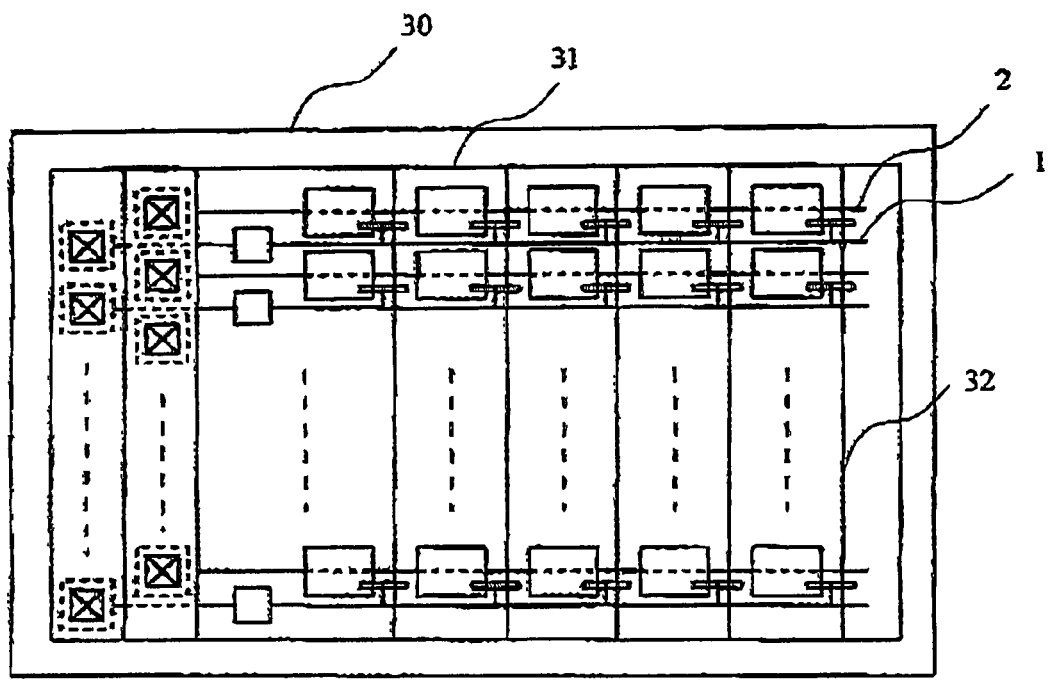
FIG. 3 is a schematic view of a TFT array substrate having short-circuited ring.

FIG. 1 is a schematic plan view for illustrating a part of the TFT array substrate of the display device according to an embodiment of the present invention. FIG. 2 is a partial schematic view of the TFT array substrate for indicating the position of the portion relating to FIG. 1 on the TFT array substrate. In FIG. 1, 1 is a scan line, 2 is an auxiliary capacitance line, 3 is an auxiliary capacitance bunching line, 4 is a scan line rectangular portion, 5 is an auxiliary capacitance line rectangular portion, 6 is a scan line rectangular corner portion, 7 is an auxiliary capacitance line rectangular corner portion, 8 is a through hole, A is a length of the right terminal of the auxiliary capacitance line rectangular portion 5 which goes beyond the line width of the auxiliary capacitance bunching line 3, and B is a length of the left terminal of the auxiliary capacitance line rectangular portion 5 which goes beyond the line width of the auxiliary capacitance bunching line 3. Additionally, the through hole 8 is used for electrically connecting the auxiliary capacitance bunching line 3 and the auxiliary capacitance line 2.

In FIG. 2, 30 is a glass substrate, 21 indicates that which part on TFT array substrate the portion shown in FIG. 1 is located, 22 indicates a region on TFT array substrate for disposing the components associated with the display function.

In a portion where the scan line 1 intersects the auxiliary capacitance bunching line 3, the wiring width of the scan line 1 is formed to be narrower, and the shape of the scan line is designed and formed as the scan line rectangular portion 4 as shown in FIG. 1. Because it allows the wiring width of the intersected scan line 1 to be narrower in such a way, so in a portion where it intersects the auxiliary capacitance bunching line 3, the relative area of the scan line 1 becomes smaller, and the wiring capacitance at this intersection portion also becomes smaller. As a result, the time constant of the scan line also becomes smaller; so that it is possible that the electrical signal having higher speed can be applied to the scan line.

In the wiring portion of the auxiliary capacitance line 2 intersecting the auxiliary capacitance bunching line 3, the wiring width of the auxiliary capacitance line 2 is enlarged, and the auxiliary capacitance line is designed and formed as the auxiliary capacitance line rectangular portion 5 as shown in FIG. 1. By enlarging the line width of the auxiliary capacitance line 2 and forming the auxiliary capacitance line rectangular portion 5, the auxiliary capacitance line rectangular corner portion 7 can be closer to the adjacent scan line rectangular corner portion 6 as compared with the condition of normal wiring shape. And the shape, size of the scan line rectangular portion 4 and the auxiliary capacitance line rectangular portion 5 can be adjusted to allow the distance between the auxiliary capacitance line rectangular corner portion 7 and the adjacent scan line rectangular corner portion 6 to be a proper value, in this way, the static charges occurred in the manufacturing process can be discharged between the auxiliary capacitance line rectangular corner portion 7 and the adjacent scan line rectangular corner portion 6.

Figure 6:
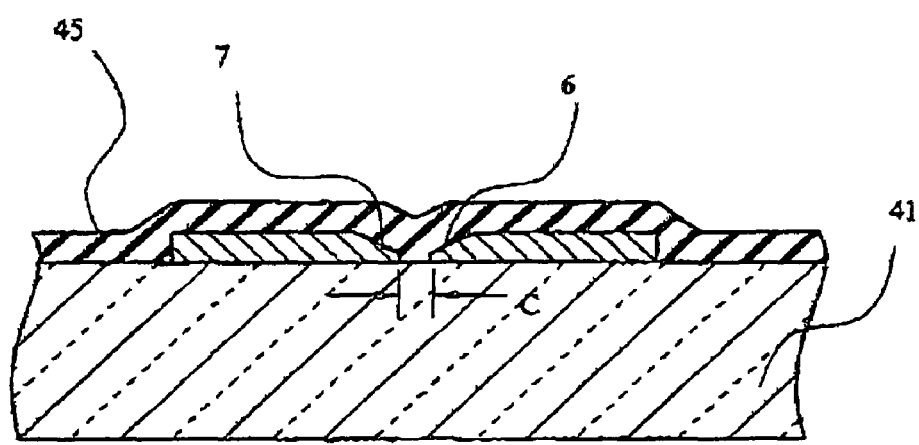
FIG. 6 is a cross sectional view for illustrating a state that the scan line rectangular corner portion is opposite to the auxiliary capacitance line rectangular corner portion.

Next, it will be described according to FIG. 6. FIG. 6 is a cross sectional view for illustrating a condition that the scan line rectangular corner portion is opposite to the auxiliary capacitance line rectangular corner portion. In FIG. 6, C is a distance between the auxiliary capacitance line rectangular corner portion 7 and the adjacent scan line rectangular corner portion 6. The space between the scan line 1 and the auxiliary capacitance line 2, and the shape and size of the scan line rectangular portion 4 and the auxiliary capacitance line rectangular portion 5 are adjusted to allow the value of C to be a value that it makes the static charges brought by the manufacturing process discharge under a condition in which huge potential difference of several thousand Volts generates between the auxiliary capacitance line rectangular corner portion 7 and the adjacent scan line rectangular corner portion 6, and that it makes the static charges not discharge under a condition in which the potential difference is about several tens Volts during the normal display device operation.

The length of the side of the scan line rectangular portion 4 at the scan line direction is larger than the wiring width of the auxiliary capacitance bunching line 3, it is preferred that the sides of the scan line rectangular portion 4 go beyond and are exposed from both sides of the wiring of the auxiliary capacitance bunching line 3 at the scan line direction. Because under such situation, the auxiliary capacitance bunching line 3 does not exist above the auxiliary capacitance line rectangular corner portion 7 and the adjacent scan line rectangular corner portion 6, so the static charges is discharged between the auxiliary capacitance line rectangular corner portion 7 and the adjacent scan line rectangular corner portion 6, as a result, even though under a condition that the pinhole has been formed the failure condition of the short circuit is uneasy to occur in the subsequent procedure for forming the auxiliary capacitance bunching line.

Figure 4:
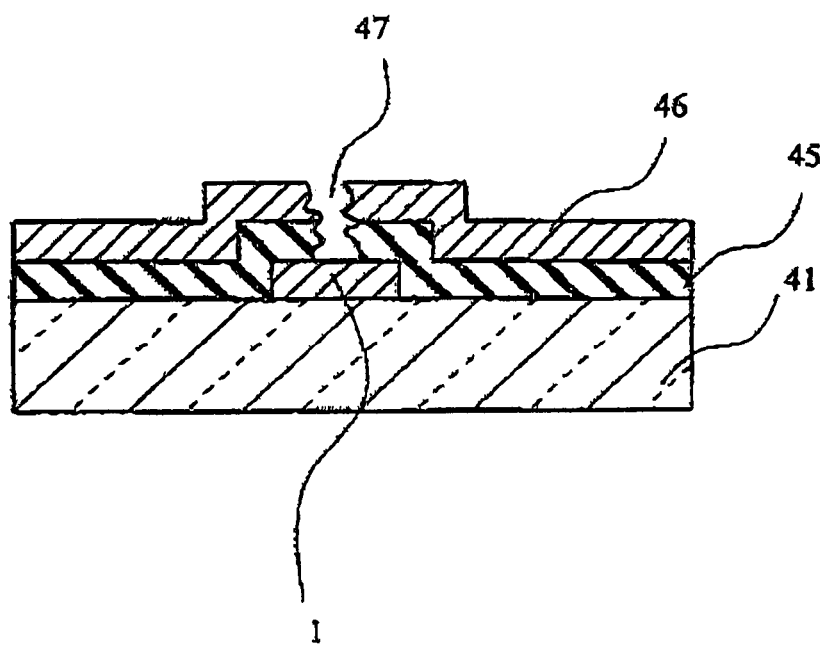
FIG. 4 is a schematic cross sectional view indicating a pinhole defect occurred due to the damaged insulating layer caused by the static discharge occurring in the manufacturing process of the display device.

The same state will be described according to FIG. 4 as follows. FIG. 4 is a cross sectional view for indicating a condition in which a pinhole defect has occurred due to the static discharge that causes the insulating layer to be damaged. Herein, assuming that a scan line 1 is under a pinhole 47, then if the signal line is formed in the subsequent manufacturing process, then the pinhole 47 will be covered by the metal, and the like. As a result, the scan line 1 and the signal line are short-circuited, and the function failure occurs. Furthermore, in FIG. 4, 45 is an insulating layer, 41 is a glass substrate, and 46 is a semiconductor layer.

Figure 5:
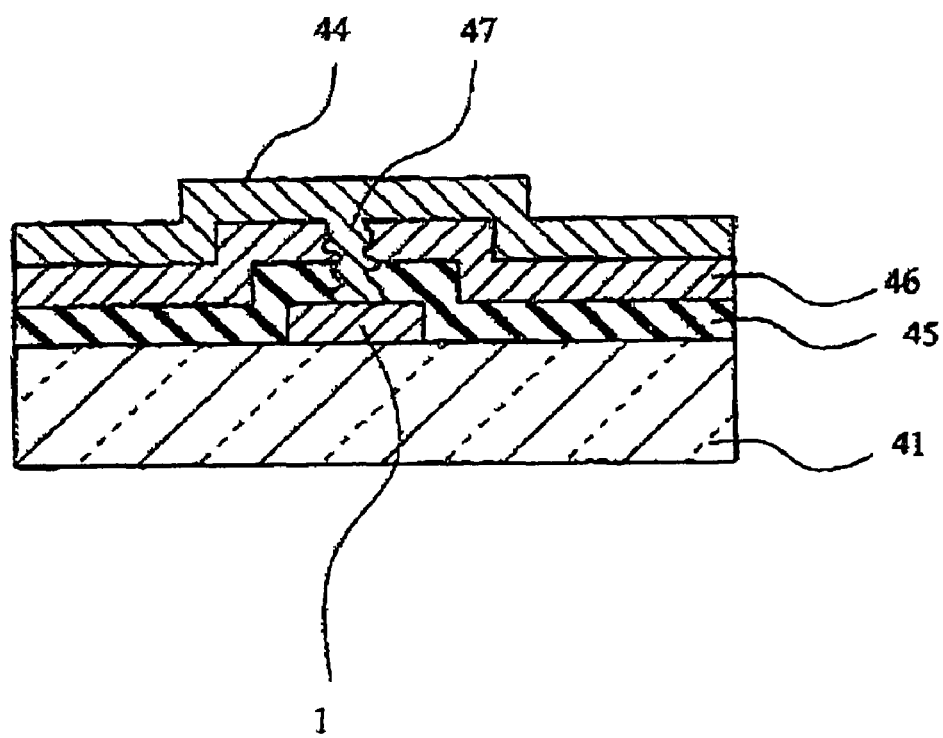
FIG. 5 is a cross sectional view for indicating a failure state of a short circuit, which is caused by the pinhole defect as shown in FIG. 4 and is occurred in the subsequent process.

FIG. 5 is a cross sectional view for indicating a failure state of a short circuit which is caused by the pinhole defect during the subsequent manufacturing process as shown in FIG. 4. In FIG. 5, 44 is a signal line, the scan line 1 and the signal line 44 are short-circuited due to the metal covering the pin hole 47 so that the function failure is caused.

Similar to the conditions shown in FIG. 4 and FIG. 5, even though the static discharge is occurred between the auxiliary capacitance line rectangular corner portion 7 and the adjacent scan line rectangular corner portion 6 and a pinhole is formed, if no any wiring is formed above it, then the function failure caused by short-circuit will not occur.

In addition, the angle formed by scan line rectangle corner 6 and auxiliary capacitance line rectangle corner 7 is about 91 degree.

As well as, TFT array substrate of the present invention is a substrate for active matrix type liquid crystal display device. The optical modulation layer between the pixel electrode array substrate and said contraposition substrate is normally liquid crystal. However, other pixel electrode array substrates having the optical modulation layer of the display device other than the liquid crystal can also be applied to the present invention.

As well as, the method for manufacturing the array substrate of the present invention employs a manufacturing method of a known photolithography process. Because it does not involve especial features, so the description thereof will be omitted.

What is claimed is:

1. A display device comprising:
   a pixel electrode array substrate, comprising: a plurality of scan lines (1), a plurality of auxiliary capacitance lines (2), signal lines formed crossing said scan lines (1) and said auxiliary capacitance lines (2), pixel electrode disposed in each of the areas formed by said plurality of scan lines (1) and said plurality of signal lines which intersect with each other;
   a contraposition substrate opposite to said pixel electrode array substrate;
   auxiliary capacitance bunching lines (3) making said plurality of auxiliary capacitance lines (2) be short-circuited peripherally around said areas and disposed in parallel with respect to said signal lines; and an
   optical modulation layer disposed between said pixel electrode array substrate and said contraposition substrate,
   wherein, a scan line rectangular portion (4) whose width of scan lines is narrowed is disposed in the portions where said scan lines (1) intersects said auxiliary capacitance bunching lines (3), and a scan line rectangular corner portion (6) is disposed on the edge of the portion whose width of scan lines is normal, an auxiliary capacitance rectangular portion (5) whose width of auxiliary capacitance lines is widened is disposed in the portions where said auxiliary capacitance lines (2) intersects said auxiliary capacitance bunching lines (3), and an auxiliary capacitance rectangular corner portion (7) opposite to said scan line rectangular corner portion (6) is disposed in said auxiliary capacitance rectangular portion (5).

2. The display device as claimed in claim 1, wherein said auxiliary capacitance line rectangular portion (5) is formed to have a line width which goes beyond the line width of said auxiliary capacitance bunching lines (3) at both sides of said intersected auxiliary capacitance bunching lines (3), meanwhile, said scan line rectangular portion (6) is also formed to have a line width which goes beyond the fine width of said auxiliary capacitance bunching lines (3) at both sides of said intersected auxiliary capacitance bunching lines (3), and the length of said auxiliary capacitance line rectangular portion (5) at the direction of said auxiliary capacitance line and the length of said scan line rectangular portion (6) at the direction of said scan line are substantially the same.

3. The display device as claimed in claim 1, wherein the angles of said scan line rectangular corner portion (6) and said auxiliary capacitance line rectangular corner portion (7) are formed to be approximately 91 degrees.

4. The display device as claimed in claim 2, wherein the angles of said scan fine rectangular corner portion (6) and said auxiliary capacitance line rectangular corner portion (7) are formed to be approximately 91 degrees.

5. The display device as claimed in claim 1, wherein said optical modulation layer comprises liquid crystal layer.

6. The display device as claimed in claim 2, wherein said optical modulation layer comprises liquid crystal layer.

7. The display device as claimed in claim 3, wherein said optical modulation layer comprises liquid crystal layer.

8. The display device as claimed in claim 4, wherein said optical modulation layer comprises liquid crystal layer.

* * * * *